(12) United States Patent
Nobis et al.

(10) Patent No.: US 8,492,701 B2
(45) Date of Patent: Jul. 23, 2013

(54) MEASURING STATION FOR MEASURING VEHICLES

(75) Inventors: Guenter Nobis, Nuertingen (DE); Steffen Abraham, Hildesheim (DE); Matthias Gebhard, Stuttgart (DE); Rudolf Merkel, Stutensee (DE); Ulrich Kallmann, Tuebingen (DE); Hilaire Gomseu Dioni, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 12/873,640

(22) Filed: Sep. 1, 2010

(65) Prior Publication Data
US 2011/0058581 A1 Mar. 10, 2011

(30) Foreign Application Priority Data
Sep. 7, 2009 (DE) .................. 10 2009 029 233

(51) Int. Cl.
*H01S 3/00* (2006.01)

(52) U.S. Cl.
USPC .................. 250/221; 250/222.2; 340/541

(58) Field of Classification Search
USPC ........ 250/559.29, 221, 222.2, 222.1; 340/541
See application file for complete search history.

(56) References Cited

U.S. PATENT DOCUMENTS

| 4,884,275 | A  | * | 11/1989 | Simms ........................ 372/9 |
| 7,126,105 | B2 | * | 10/2006 | Ramer ....................... 250/221 |
| 7,167,575 | B1 | * | 1/2007 | Nichani et al. ............... 382/103 |
| 7,187,282 | B2 | * | 3/2007 | Fergusson .................... 340/567 |
| 2004/0246471 | A1 | * | 12/2004 | Matsuura et al. .......... 356/141.4 |

* cited by examiner

*Primary Examiner* — Tony Ko
(74) *Attorney, Agent, or Firm* — Kenyon & Kenyon LLP (57) ABSTRACT

A measuring station for measuring vehicles has at least one laser source, which emits laser radiation (20) during operation, and a safety system, which includes at least one sensor, which is set up to detect objects. The safety system is configured in such a way that it switches off the laser source when at least one sensor detects an object which approaches a region in which the laser radiation emitted by the laser source has a particularly high intensity.

10 Claims, 5 Drawing Sheets

MEASURING STATION FOR MEASURING VEHICLES

RELATED APPLICATION INFORMATION

The present application claims priority to and the benefit of German patent application no. 10 2009 029 233.0, which was filed in Germany on Sep. 7, 2009, the disclosure of which is incorporated herein by reference.

FIELD OF THE INVENTION

The present invention relates to a measuring station for measuring vehicles and, in particular, to a measuring station for measuring vehicles having a laser source and a safety system for monitoring the laser source.

BACKGROUND INFORMATION

The use of laser radiation on a measuring station for measuring vehicles, especially for measuring the chassis of a vehicle, is known from the related art. Since laser radiation, once it reaches a certain intensity, poses a danger to persons who are present in the area of the measuring station, safety measures and/or safety devices are required in order to prevent persons in the vicinity of the measuring station from being injured as a result of the laser radiation.

For example, mechanical protection devices such as laser-protection funnels are known, which prevent persons from entering a region of dangerous laser radiation. Such mechanical protection devices have a certain weight and volume, which complicates the setup of such a measuring station and hampers the work at such a measuring station.

SUMMARY OF THE INVENTION

One objective of the exemplary embodiments and/or exemplary methods of the present invention is to provide a measuring station for measuring vehicles, which offers protection from laser radiation which is used for measuring vehicles, without making it difficult to work at the measuring station.

The objective may be achieved by a measuring station for measuring vehicles according to the description herein. Also described herein are advantageous developments of such a measuring station.

A measuring station according to the present invention for measuring vehicles, in particular for measuring the chassis of a vehicle, includes at least one laser source, which emits at least one laser beam during operation, which is used for measurement and/or projection purposes. A measuring station according to the present invention also includes a safety system having at least one sensor. The at least one sensor is designed and placed in such a way that it monitors at least one region in which the laser radiation emitted by the laser source is of particularly high intensity, and which emits a signal if an object approaches the monitored region. The safety system is set up in such a way that it deactivates the laser source if it receives a signal from at least one of the sensors that indicates that an object is approaching the region in which the laser radiation has a particularly high intensity.

In addition to inanimate objects, especially people and body parts of people are also considered objects in this and the following contexts. On a measuring station according to the exemplary embodiments and/or exemplary methods of the present invention, the laser source is switched off when an object approaches the region having laser radiation of especially high intensity. This prevents an object from being irradiated by high-intensity laser radiation and thereby ensures the safety at the measuring station.

Because a measuring station according to the present invention does not have any mechanical safety devices, the work at the measuring station is not hampered or is not made more difficult by such safety devices.

In one specific embodiment, the approach of an object in a region having high-intensity laser radiation is detected by determining that the object is entering at least one monitored region that is adjacent to the high-intensity region. Determining the penetration of an object in a specified monitored region is especially easy to realize when using sensors.

In one specific development, the safety system has a plurality of sensors, and the regions monitored by the sensors (monitored regions) overlap at least partially. The use of a plurality of sensors, whose monitored regions overlap at least partially, increases the safety even further since the laser source is switched off when one of the sensors malfunctions.

In one specific embodiment, at least one of the sensors is realized as photoelectric barrier. Using a photoelectric barrier makes it possible to detect the entry of an object in a monitored region in an especially cost-effective and reliable manner. A photoelectric barrier may include two sensors lying diametrically opposed from each other, of which one is designed as transmitter in each case and one as receiver. As an alternative, a photoelectric barrier may be designed as reflected-light barrier, in which the receiver receives light that is emitted by the transmitter and has been reflected by an object in the monitored region or by a reflector. A photoelectric barrier may be operated using light of the visible frequency range or invisible light, such as infrared light, for example.

In one specific embodiment, at least one of the sensors is realized as infrared sensor. Infrared sensors have shown to be cost-effective and reliable sensors for determining the presence of an object in a monitored region in a reliable manner.

In one specific embodiment, at least one of the sensors is realized as ultrasonic sensor. Ultrasonic sensors have shown to be cost-effective and reliable sensors for determining the presence of an object in a monitored region.

In one specific embodiment, at least one sensor is designed as capacitive sensor. A capacitive sensor makes it possible to monitor a large monitored region in a simple and reliable manner.

In one specific embodiment, at least one of the sensors is designed as camera, especially as stereo camera. A camera makes it easy to monitor a large monitored region. In particular the position of an object in the monitored region is able to be determined in a reliable manner and with high accuracy.

In one specific embodiment, the measuring station is equipped with at least two different types of sensors, the types of sensors being selected from a group that includes at least one ultrasonic sensor, one infrared sensor, one photoelectrical barrier, one capacitive sensor, and one camera. Using two different types of sensors increases the reliability of the safety device since objects that are poorly detected by one type of sensor, or are not detected by it at all, are reliably detectable by the other sensor. For example, transparent objects that are difficult to detect by a photoelectric barrier or a camera, may be reliably detected by an ultrasonic sensor or a capacitive sensor.

In one specific embodiment, the sensors are situated around an exit opening of the laser source through which laser radiation is emitted when the laser source is in operation. Sensors disposed in this manner monitor the region having high-intensity laser radiation in the vicinity of the exit opening and in the monitored regions that are adjacent to this region in an especially satisfactory and reliable manner. The mounting of the sensors about the exit opening of the laser source allows a particularly compact design of a measuring station having one or a plurality of laser source(s) and a plurality of sensors, so that the sensors do not restrict the freedom of movement at the work station or restrict it only to a negligible degree.

Hereinafter, the exemplary embodiments and/or exemplary methods of the present invention will be explained in detail by way of example with reference to the attached drawing.

DETAILED DESCRIPTION

Figure 1:
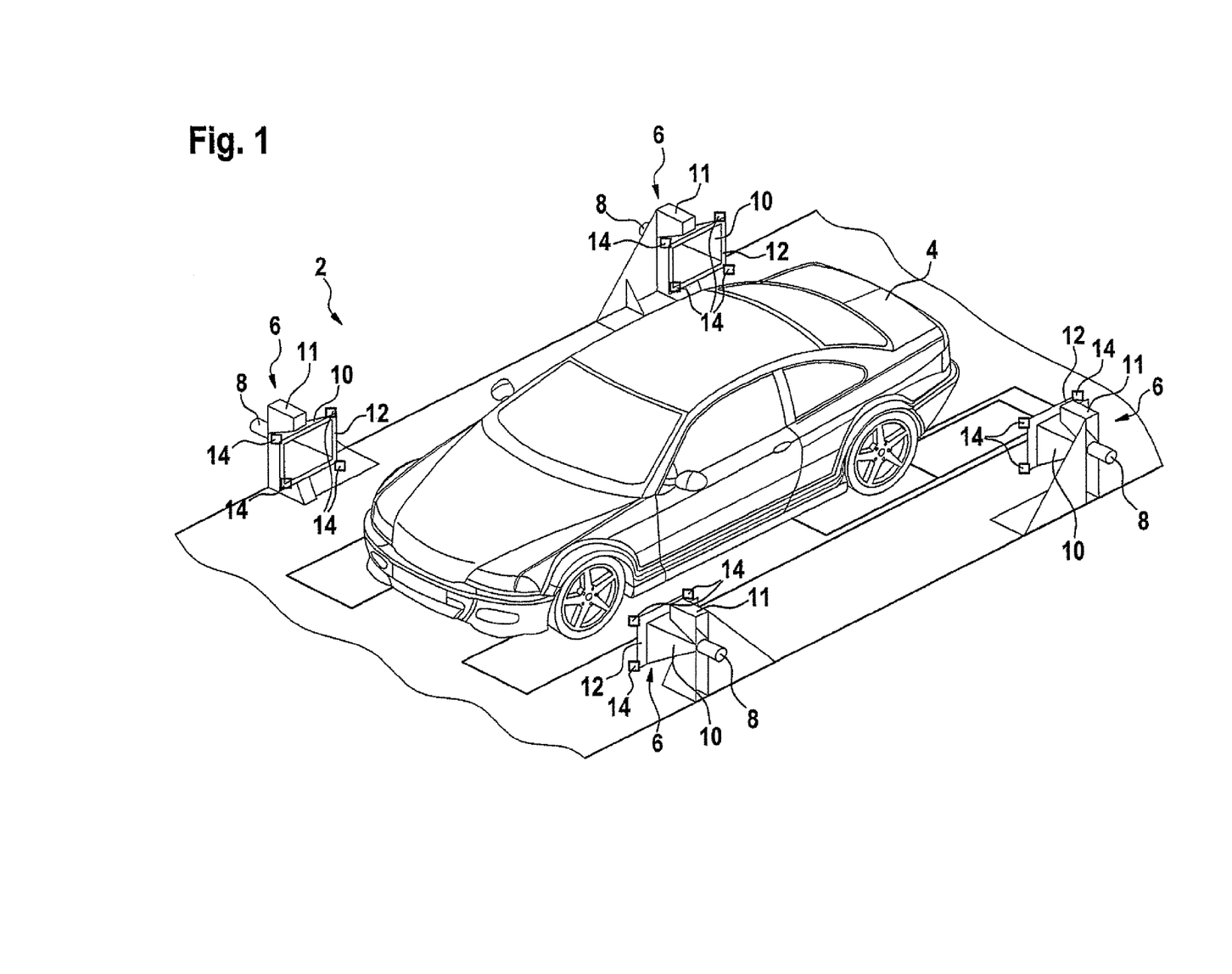
FIG. 1 shows a perspective view of a measuring station for measuring a vehicle according to the present invention.

FIG. 1 shows a perspective view of an exemplary embodiment of a measuring station 2 for measuring vehicles according to the exemplary embodiments and/or exemplary methods of the present invention, together with a two-axle vehicle 4.

Measuring station 2 has four measuring devices 6, which are disposed at the corners of a hypothetical rectangle whose transverse sides are aligned parallel to the two axles of vehicle 4 and whose longitudinal sides are aligned parallel to the longitudinal sides of vehicle 4. The transverse sides of the hypothetical rectangle are longer than the axles of vehicle 4, so that measuring devices 6 are situated at a distance from the wheels of vehicle 4 mounted at the ends of the axles.

In the exemplary embodiment shown in FIG. 1, two measuring devices 6 are situated at the side of vehicle 4 in an extension of the front axle, in front of the wheels mounted on the front axle. Two additional measuring devices 6 are situated next to the vehicle in a position behind the rear axle of vehicle 4. The clearance between measuring devices 6 is adjustable, at least in the longitudinal direction of measuring station 2, i.e., in a direction that extends at a right angle with respect to the axles of vehicle 4, so that rear measuring devices 6 are able to be placed in front of the rear wheels mounted on the rear axle of vehicle 4 in an extension of the rear axle.

Each measuring device 6 has a laser source 8, which emits a laser beam during operation, which impinges upon on optical element (not visible in FIG. 1), such as a diffraction grating, which generates a laser light pattern from the laser beam and is employed in the vehicle measurement for measuring and projection purposes.

Implemented on the side of each laser source 8 facing vehicle 4 is a laser protection funnel 10, which prevents an object from approaching the vicinity of the exit opening of laser source 8 where the intensity of the laser radiation generated by laser source 8 is particularly high. The side of each laser protection funnel 10 facing away from laser source 8 and facing vehicle 4 is sealed off by a rectangular protection window 12, which is transparent to the laser radiation. With the aid of protection window 12 it is prevented that an object gets inside laser protection funnel 10 and thus into the vicinity of the exit opening of laser source 8. Conventional laser protection funnels 10 have a length of up to 250 mm, for example, in order to ensure effective protection from dangerous laser radiation.

Affixed at the four corners of each rectangular protection window 12 is a sensor 14, which monitors a region between the opening of laser protection funnel 10 facing vehicle 4, and vehicle 4, where high-intensity laser radiation is present when laser source 8 is in operation, and/or which monitors regions that are adjacent to this area.

Each sensor 14 is connected to at least one safety and control device (not shown in FIG. 1), which switches the particular laser source 8 off if at least one of sensors 14 detects an object in the region it monitors. This ensures the safety at measuring station 2, and laser protection funnels 10 are able to have a smaller length than the length of approx. 250 mm that has previously been the norm. Laser protection funnels 10 may be reduced to a length of approximately 100 mm, in particular. In one exemplary embodiment, which is not shown here, the mounting of a protection window 12 at the exit opening of laser protection funnel 10 is dispensed with, since laser source 8 is switched off by the safety and control device if an object approaches the opening of laser protection funnel 10.

Because of the low length of laser protection funnel 10, which is possible when using a safety system according to the exemplary embodiments and/or exemplary methods of the present invention, and by dispensing with protection windows 12 as the case may be, the work at measuring station 2 is made easier since smaller laser protection funnels 10 allow greater freedom of movement at measuring station 2.

Sensors 14 can be any type of sensors 14 that are suitable for detecting an object that is situated in the region (monitored region) between the particular laser protection funnel 10 and vehicle 4 monitored by individual sensor 14.

Figure 2:
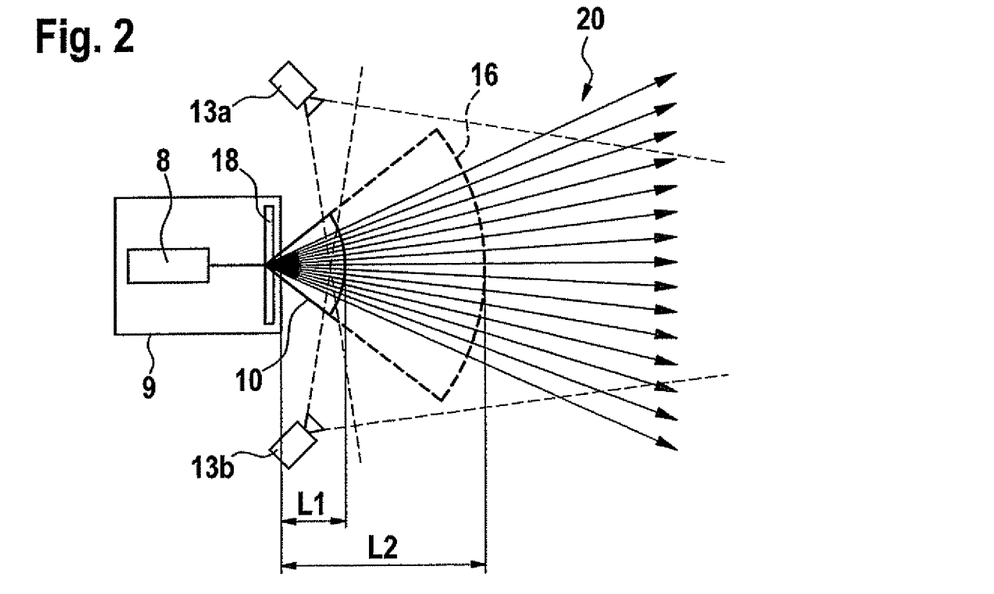
FIG. 2 shows a schematic plan view of a first exemplary embodiment of a laser protection device according to the present invention.

FIG. 2 shows a schematic plan view of a first exemplary embodiment of a laser protection device according to the exemplary embodiments and/or exemplary methods of the present invention. A laser source 8 and an optical element 18 are accommodated in a housing 9, on which a laser protection funnel 10 is mounted. A laser light pattern 20, which is produced when optical element 18 is irradiated by a laser beam generated by laser source 8, emerges through an opening on the side of laser protection funnel 10 facing away from optical element 18, in the direction of vehicle 4, which is not shown in FIG. 2.

A camera 13a, 13b is situated at both sides of laser protection funnel 10 and monitors a particular region of the space located in front of the exit opening of laser protection funnel 10. Using the images recorded by cameras 13a, 13b, an evaluation device (not shown in FIG. 2) determines the position of each object that is located in at least one of the regions monitored by cameras 13a, 13b. If the evaluation devices determines during the evaluation that a detected object is located inside a monitored region 16 defined around the exit opening of laser protection funnel 10, then the evaluation device switches laser source 8 off.

Defined monitored region 16 is greater than the region inside which dangerous laser radiation 20 is present. As a result, if an object approaches the region having dangerous laser radiation 20, laser source 8 is reliably deactivated even before the object has entered the region having dangerous laser radiation 20.

Outside monitored region 16, due to the greater distance from laser source 8, the intensity of the radiation of laser light pattern 20 has decreased so considerably that it poses no danger. Thus, there is no need to also monitor this particular region, which is situated to the right of monitored region 16 in FIG. 2.

Because of the use of a laser protection device according to the exemplary embodiments and/or exemplary methods of the present invention, the length of laser protection funnel 10 is able to be reduced from a length L2 (e.g., 250 mm) as it is commonly used in conventional work stations, to a shortened length L1 (e.g., 100 mm). Such a measuring device is more compact than conventional measuring devices, since large laser protection funnels 10, which would restrict the freedom of movement at measuring station 2 and thus hamper work at measuring station 2, are able to be dispensed with.

The use of two cameras 13a, 13b as shown in FIG. 2 is only exemplary. Additional cameras may be installed and employed in order to improve the accuracy of the evaluation and/or in order to further increase the safety of the system through redundancy.

Figure 3:
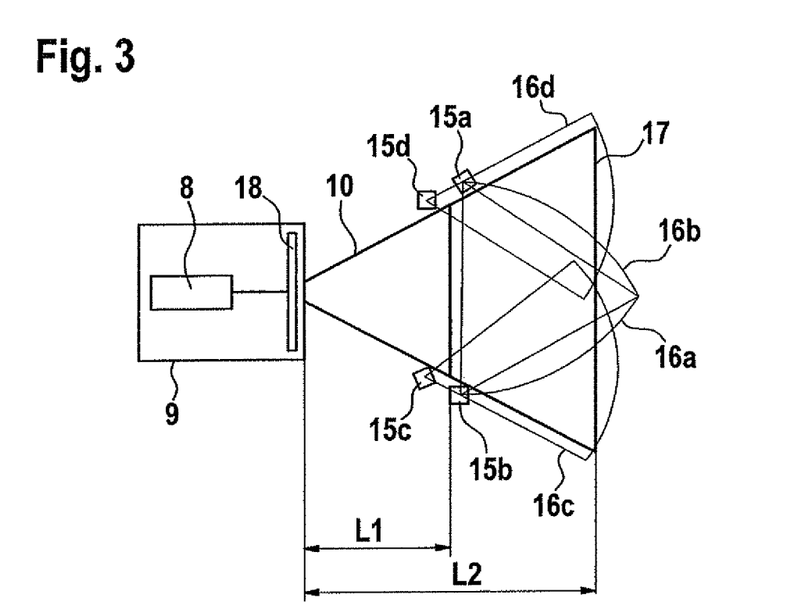
FIG. 3 shows a schematic plan view of a second exemplary embodiment of a laser protection device according to the present invention.

FIG. 3 shows a second exemplary embodiment of a laser protection device according to the present invention. Housing 9, which includes laser source 8, optical element 18 and laser protection funnel 10, corresponds to the setup shown in FIG. 2. During operation of laser source 8, optical element 18 generates a laser light pattern 20 as it is shown in FIG. 2. Laser light pattern 20 is not shown in FIG. 3 for reasons of greater clarity.

In this exemplary embodiment, four sensors 15a-15d, which are developed as ultrasonic sensors, for example, are disposed around laser protection funnel 10. Each sensor 15a-15d monitors a region 16a-16d assigned to individual sensor 15a-15d, which region takes the form of a spherical segment in three-dimensional space. In the two-dimensional projection illustrated in FIG. 3, the spherical segments appear as circle segments 16a-16d.

The monitored regions 16a-16d of the four sensors 15a-15d partially overlap each other and jointly form a monitored region that essentially takes the form of a trapezoid 17 disposed in front of the opening of laser protection funnel 10. Laser source 8 is switched off when at least one of sensors 15a-15d determines the presence of an object in region 16a-16d it is monitoring. Laser source 8 is therefore switched off reliably once an object penetrates monitored region 17. Because of the fact that monitored region 17 is larger than the region having the laser radiation of dangerous intensity, laser source 8 is reliably switched off before an object gains entry to the region having the dangerous laser radiation.

Since monitored regions 16a-16d of the four sensors 15a-15d overlap at least partially, sensors 15a-15d operate at least partially in redundant fashion, so that the safety of measuring station 2 is ensured even if one of the sensors 15a-15d malfunctions. In exemplary embodiments that are not shown still more sensors may be provided in order to increase the safety of the measuring station even further by additional redundancy, and/or in order to adapt the form of monitored region 17 to the special requirements of measuring station 2.

Figure 4:
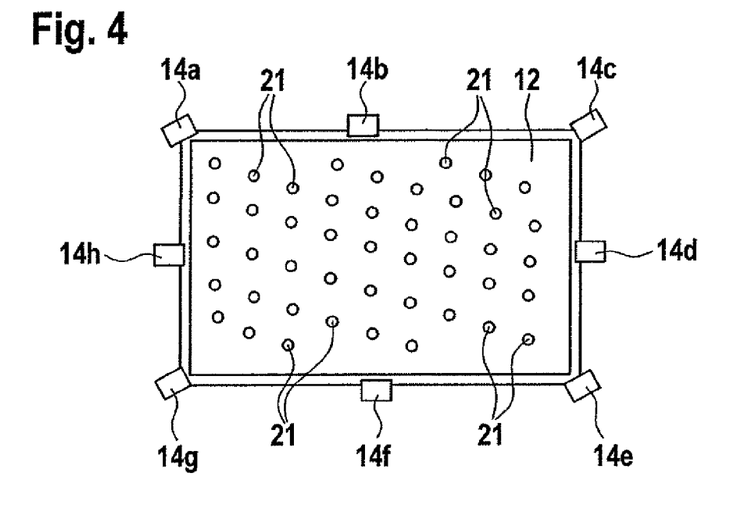
FIG. 4 shows a schematic illustration of a system of sensors around an exit opening of a laser source.

FIG. 4 shows an end face of a laser protection funnel 10 facing vehicle 4. In the exemplary embodiment shown in FIG. 4, the end face of laser protection funnel 10 is sealed by a rectangular plate 12 which is transparent to laser radiation, such as a glass panel or a safety glass panel, for example. Eight sensors 14a-14h, which are implemented as ultrasonic or infrared sensors, for instance, are disposed around the edge of plate 12. Four sensors 14a, 14c, 14e, 14g are situated at the corners of rectangular plate 12 in each case, and one sensor 14b, 14d, 14f, 14h is disposed in the center of one side of rectangular plate 12 in each case. Rectangular plate 12 has an area of 180 mm×150 mm and a thickness of 3 mm, for example. A number of points of light 21 of laser light pattern 20 produced by optical element 18 are shown on plate 12 by way of example.

In one exemplary embodiment (not shown), plate 12 is omitted. In this case the safety is ensured solely by sensors 14a-14h and an evaluation device (not shown), which switches laser source 8 (not shown in FIG. 4) off once an object penetrates the region (monitored region) monitored by sensors 14a-14h in front of the opening of laser protection funnel 10.

Since a plurality of sensors 14a-14h is disposed around the exit opening of laser protection funnel 12, objects approaching the region having the high-intensity laser radiation are reliably detected, so that laser source 8 (not shown in FIG. 4) is switched off in a timely manner before an object reaches the region of high-intensity laser radiation. Sensors 14a-14h may be disposed and designed in such a way that the monitored regions of sensors 14a-14h overlap. This produces redundancy, which further increases the safety of the system since laser source 8 in such a redundant array of sensors 14a-14h will be reliably switched off if one of one of sensors 14a-14h fails, as soon as an object approaches the region having the laser radiation of high and thus dangerous intensity and penetrates the monitored region of at least one of sensors 14a-14h.

In one exemplary embodiment, each sensor 14a-14h includes at least one ultrasonic or infrared transmitter and at least one ultrasonic or infrared receiver, the receiver of each sensor 14a-14h being designed to receive a signal that is emitted by the transmitter of a sensor 14a-14h and reflected by an object situated in the monitored region.

In one alternative exemplary embodiment, a few of the sensors 14a-14h are implemented as ultrasonic or infrared transmitters, and other sensors 14a-14h as ultrasonic or infrared receivers. Sensors 14a-14h, which are developed either only as transmitters or only as receivers, are able to be produced in an especially compact manner and thus may be mounted at the edge of laser protection funnel 10 in a particularly uncomplicated manner, without mechanically stressing the edge to any significant degree. Symmetrical placement of sensors 14a-14h as it is shown in FIG. 4 leads to a symmetrical monitored region and to symmetrical mechanical loading of laser protection funnel 10, so that an undesired deformation of laser protection funnel 10 due to the weight of sensors 14a-14h is able to be avoided.

In one exemplary embodiment, the propagation time of the signal reflected by an object situated in the monitored region is measured and the distance of the object from the respective transmitter and receiver is determined on this basis. In this way the position of an object in the monitored region is able to be determined in an especially effective and precise manner.

Figure 5:
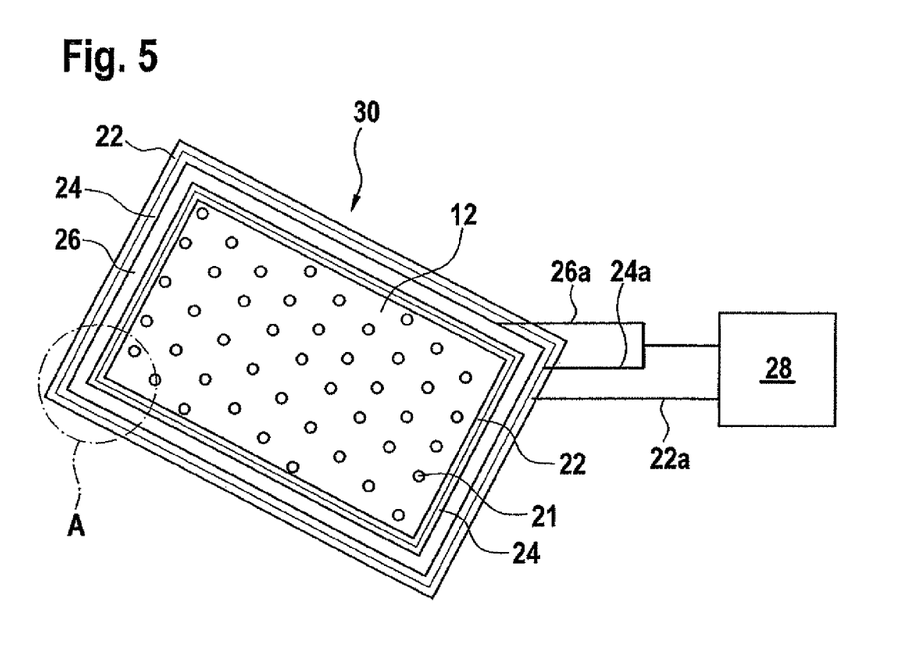
FIG. 5 shows a schematic illustration of a capacitive sensor system, which is disposed around an exit opening of a laser source.

FIG. 5 shows a plan view of an opening of a laser protection funnel 10 having a capacitive sensor system 30 in a schematized illustration.

On an edge 22 of the opening of a laser protection funnel 10, which is sealed by a rectangular plate 12 that is transparent to laser radiation and on which points 21 of a laser pattern 20 are shown by way of example, a shield electrode 24 is formed, which completely frames the opening of laser protection funnel 10. An effective electrode 26, which is not as wide as shield electrode 24, is formed in a central region of shield electrode 24, so that a striped pattern made up of five abutting stripes is discernible in the plan view as shown in FIG. 5. The pattern sequentially includes edge 22 of laser protection funnel 10, shield electrode 24, effective electrode 26, shield electrode 24 and edge 22 of protective funnel 10. Edge 22 of protective funnel 10 is made of metal or coated by a metal layer and connected via a ground line 22a to an electrical signal-processing device 28. Shield electrode 24 and effective electrode 26 are likewise connected to signal-processing device 28 via electrical lines 24a, 26a.

In response to the application of an electrical voltage between effective electrode 26 and edge 22 of protection funnel 10, an electrical field is generated between effective electrode 26 and edge 22 of protection funnel 10. If an object enters this electrical field, then the characteristic of the electrical field changes. The change of the electrical field is registered by signal-processing device 28. Signal-processing device 28 then emits a corresponding signal to a superposed evaluation and control unit, which is not shown in FIG. 5. As soon as the evaluation and control unit receives such a signal, it deactivates associated laser source 8. Signal-processing device 28 may also be integrated in the evaluation and control unit.

Figure 6:
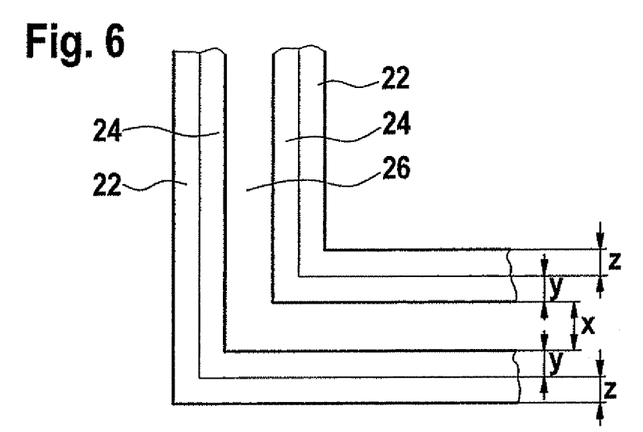
FIG. 6 shows a schematized, enlarged illustration of a cut-away section of the capacitive sensor system shown in FIG. 5.

FIG. 6 shows an enlarged cutaway A from electrode array 22, 24, 26 shown in FIG. 5. If x is the width of effective electrode 26, 2y+x the width of shield electrode 24, and 2z+2y+x the width of metal edge 22 of laser protection funnel 10, then the edge of the opening of a laser protection funnel 10 having a capacitive sensor system 30 has a width of at least d=2z+2y+x. Since, as described before, it is possible when using a laser protection device according to the present invention to use laser protection funnels 10 that are smaller than conventional laser protection funnels 10 and which also have smaller openings, the slight increase in the outer dimensions of laser protection funnels 10 caused by electrode array 22, 24, 26 is negligible.

Figure 7:
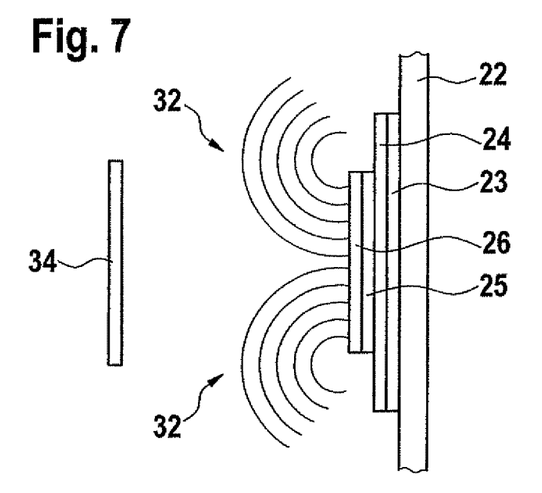
FIG. 7 shows an explained block diagram of a capacitive sensor system.

FIG. 7 shows the method of functioning of a capacitive sensor system 30 according to FIGS. 5 and 6 in a schematized sectional view.

A shield electrode 24, which is electrically insulated from metal edge 22 of laser protection funnel 10 by a first insulation layer 23, is mounted at edge 22 of a laser protection funnel 10, the edge being made of metal or being metal-coated. An effective electrode 26 is mounted on shield electrode 24, which is electrically insulated from shield electrode 24 by a second insulating layer 25. An electrical field 32 is generated by applying an electrical voltage between effective electrode 26 and edge 22 of laser protection funnel 10. The entrance of an object 34 in electrical field 32 leads to a change in electrical field 32. The change in electrical field 32 causes a change in the capacitance formed by metal edge 22, shield electrode 24 and effective electrode 26. This change is detected by a signal-processing device 28, which is not shown in FIG. 7. In this way signal-processing device 28 detects the entry of an object 34 in the monitored region of capacitive sensor system 30.

If necessary, effective electrode 26 and/or shield electrode 24 may also be composed of a plurality of individual electrodes in order to make capacitive sensor system 30 easier to adjust.

Shield electrode 24 forms a homogenous electrical field, which reduces any disturbance of electrical stray field 32 utilized for detecting object 34, and which is formed in response to the application of an electrical voltage between effective electrode 26 and edge 22 of laser protection funnel 10. This makes it possible to amplify the useful signal emitted by capacitive sensor system 30 and to increase the range of capacitive sensor system 30.

Figure 8:
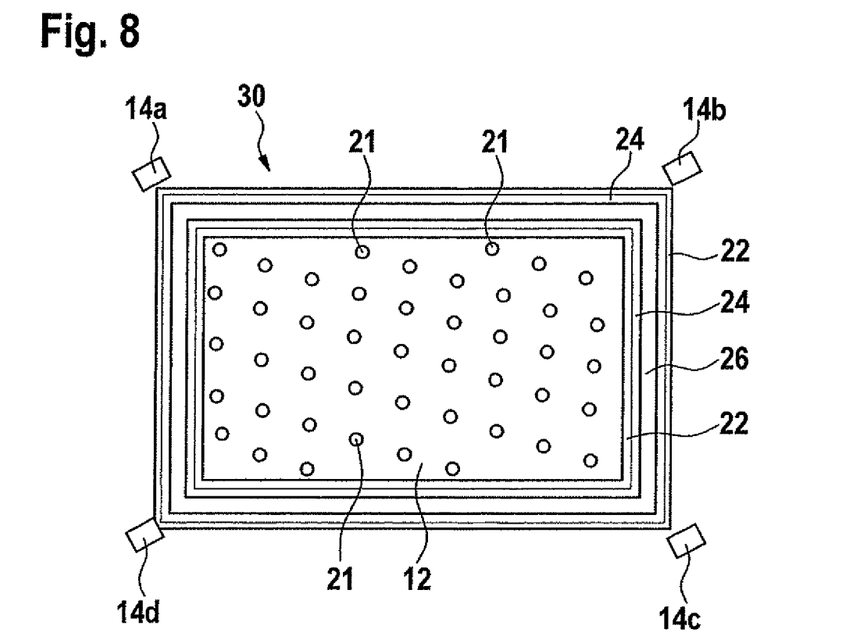
FIG. 8 shows a schematized illustration of an exit opening of a laser source, around which a capacitive sensor system and ultrasonic sensors are disposed.

FIG. 8 shows another exemplary embodiment of a sensor system according to the present invention; in addition to electrode array 22, 24, 26 of capacitive sensor system 30 according to the exemplary embodiment shown in FIGS. 6 and 7, four ultrasonic sensors 14a-14d are provided. Both the electrodes 22, 24, 26 of capacitive sensor system 30 and ultrasonic sensors 14a-14d are electrically connected to an evaluation and control unit 28, which is not shown.

The combination of a capacitive sensor system 30 with ultrasonic sensors 14a-14d increases the safety of the system since in case of a malfunction of one type of sensor, an object penetrating the monitored region is detected at least by the sensors of the other type. Instead of combining it with ultrasonic sensors 14a-14d according to the exemplary embodiment shown in FIG. 8, capacitive sensor system 30 may also be combined with infrared sensors 14a-14d, photoelectric barriers 14a-14h, other optical sensors and/or cameras 13a, 13b in order to ensure a redundant and reliable detection of any object that penetrates a monitored region 17.

What is claimed is:

1. A measuring station for measuring a vehicle, comprising:
   at least one laser source, which emits laser radiation during operation;
   a laser protection funnel located on the laser source where the intensity of the laser radiation generated by the laser source is particularly high;
   a protection window facing away from the laser source and facing towards the vehicle; and
   a safety system, which has at least one sensor, which is set up around the protection window to detect objects;
   wherein the safety system is configured so that it monitors a region between the opening of the laser protection funnel facing the vehicle and the vehicle, and switches the laser source off when the at least one sensor detects an object that approaches a region in which the laser radiation emitted by the laser source has a high intensity.

2. The measuring station of claim 1, wherein the at least one sensor monitors at least one monitored region, which is adjacent to the region having laser radiation of the high intensity, and wherein the safety system is configured so that it switches the laser source off if at least one sensor detects at least one object in the monitored region it monitors.

3. The measuring station of claim 2, wherein the safety system includes a plurality of sensors, and wherein the monitored regions of the sensors overlap at least partially.

4. The measuring station of claim 1, wherein the at least one sensor includes an infrared sensor.

5. The measuring station of claim 1, wherein the at least one sensor includes an photoelectric barrier.

6. The measuring station of claim 1, wherein the at least one sensor includes an ultrasonic sensor.

7. The measuring station of claim 1, wherein the at least one sensor includes a capacitive sensor.

8. The measuring station of claim 1, wherein the at least one sensor includes a camera.

9. The measuring station of claim 1, wherein the safety system includes at least two different types of sensors, the types of sensors including an ultrasonic sensor, an infrared sensor, a photoelectric barrier, a capacitive sensor, and a camera.

10. The measuring station of claim 3, wherein the at least one sensor includes a plurality of sensors which are disposed around an exit opening of the laser source, through which the laser radiation emerges during operation of the laser source.

* * * * *